(12) United States Patent
Ruiz et al.

(10) Patent No.: US 12,043,102 B2
(45) Date of Patent: Jul. 23, 2024

(54) ELECTRIFIED VEHICLE ROOF-MOUNTED BACKUP BATTERY

(71) Applicant: Ford Global Technologies, LLC, Dearborn, MI (US)

(72) Inventors: J. Elias Ruiz, Atizapan (MX); Sergio Becerril, Mexico City (MX); Veronica Garza, Mexico City (MX); Jose Uriel Hernandez, Tultitlán (MX)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 17/545,505

(22) Filed: Dec. 8, 2021

(65) Prior Publication Data

US 2023/0173902 A1 Jun. 8, 2023

(51) Int. Cl.
| | |
|---|---|
| *B60K 1/04* | (2019.01) |
| *B60L 50/64* | (2019.01) |
| *B60L 53/16* | (2019.01) |
| *B60R 9/058* | (2006.01) |
| *H01M 50/204* | (2021.01) |
| *H02J 9/06* | (2006.01) |

(52) U.S. Cl.
CPC .............. *B60K 1/04* (2013.01); *B60L 50/64* (2019.02); *B60L 53/16* (2019.02); *B60R 9/058* (2013.01); *H01M 50/204* (2021.01); *H02J 9/061* (2013.01); *B60K 2001/0405* (2013.01)

(58) Field of Classification Search
CPC ... B60K 1/04; B60K 2001/0405; B60L 50/64; B60L 53/16; B60L 53/14; B60L 50/66; B60L 53/80; B60L 58/26; B60R 9/058; H01M 50/204; H01M 50/249; H01M 2220/20; H02J 9/061; H02J 2310/48; H02J 7/0042; H02J 7/342; Y02T 10/70; Y02T 10/7072; H01R 11/281
See application file for complete search history.

(56) References Cited

U.S. PATENT DOCUMENTS

| | | | |
|---|---|---|---|
| 4,013,300 | A | 3/1977 | Berger |
| 4,141,425 | A | 2/1979 | Treat |
| 5,765,656 | A | 6/1998 | Weaver |
| 6,445,080 | B1 * | 9/2002 | Daqoa ..................... B60K 5/00 307/9.1 |
| 6,456,040 | B1 | 9/2002 | Hamilton |
| 7,573,151 | B2 | 8/2009 | Acena et al. |

(Continued)

FOREIGN PATENT DOCUMENTS

| | | |
|---|---|---|
| CN | 1078560 A | 11/1993 |
| CN | 1239927 A | 12/1999 |

(Continued)

*Primary Examiner* — James A Shriver, II
*Assistant Examiner* — Michael T. Walsh
(74) *Attorney, Agent, or Firm* — David B. Kelley; Carlson, Gaskey & Olds, P.C.

(57) ABSTRACT

An electrified vehicle backup battery system includes a traction battery pack of an electrified vehicle, and a backup battery assembly that is removably mounted to the electrified vehicle. The backup battery assembly is configured to recharge the traction battery pack through a charge port of the electrified vehicle. A traction battery pack charging method includes recharging a traction battery pack of an electrified vehicle from a backup battery assembly that is mounted above a roof of the electrified vehicle.

17 Claims, 2 Drawing Sheets

(56) References Cited

U.S. PATENT DOCUMENTS

| | | | |
|---|---|---|---|
| 7,612,524 | B2 | 11/2009 | Howell et al. |
| 7,703,315 | B2 | 4/2010 | Ehlers |
| 8,084,993 | B1 | 12/2011 | Wong |
| 8,302,997 | B2 | 11/2012 | Veenstra |
| 8,307,930 | B2 | 11/2012 | Sailor et al. |
| 9,566,954 | B2 | 2/2017 | Moskowitz |
| 9,586,497 | B2 | 4/2017 | Epstien et al. |
| 9,887,570 | B2 * | 2/2018 | Johnsen .................. B60L 53/14 |
| 10,183,563 | B2 * | 1/2019 | Rayner .................. B62K 27/06 |
| 10,252,632 | B2 | 4/2019 | Hernandez Lopez et al. |
| 10,576,833 | B2 * | 3/2020 | Malek .................... H02J 50/80 |
| 2008/0079389 | A1 | 3/2008 | Howell et al. |
| 2009/0079384 | A1 | 3/2009 | Harris |
| 2009/0096285 | A1 | 3/2009 | Acena et al. |
| 2009/0241651 | A1 | 10/2009 | Ehlers |
| 2010/0117594 | A1 | 5/2010 | Bissontz |
| 2010/0123352 | A1 | 5/2010 | Elleman et al. |
| 2010/0184560 | A1 | 7/2010 | Campbell |
| 2010/0231164 | A1 | 9/2010 | Yang |
| 2010/0320959 | A1 | 12/2010 | Tomberlin et al. |
| 2011/0011659 | A1 | 1/2011 | Sailor et al. |
| 2011/0012423 | A1 | 1/2011 | Gollmer et al. |
| 2012/0191278 | A1 | 7/2012 | Wippler |
| 2015/0054460 | A1 | 2/2015 | Epstien et al. |
| 2018/0345805 | A1 | 12/2018 | Hernandez Lopez et al. |
| 2019/0047432 | A1 | 2/2019 | Clark |
| 2020/0152940 | A1 | 5/2020 | Butterfield et al. |
| 2022/0080851 | A1* | 3/2022 | MacManus ............. B60L 53/65 |
| 2023/0094716 | A1* | 3/2023 | Zenner ................... B60L 1/006 |
| | | | 320/109 |
| 2023/0105038 | A1* | 4/2023 | Liu ..................... G05B 19/042 |
| | | | 701/1 |

FOREIGN PATENT DOCUMENTS

| | | | | |
|---|---|---|---|---|
| CN | 2863540 | Y | 1/2007 | |
| CN | 101010215 | A | 8/2007 | |
| CN | 101044039 | A | 9/2007 | |
| CN | 101186185 | A | 5/2008 | |
| CN | 101223056 | A | 7/2008 | |
| CN | 101407180 | A | 4/2009 | |
| CN | 101834460 | A | 9/2010 | |
| CN | 102133888 | A | 7/2011 | |
| CN | 102205800 | A | 10/2011 | |
| CN | 102216101 | A | 10/2011 | |
| CN | 201998813 | U | 10/2011 | |
| CN | 102490622 | A | 6/2012 | |
| CN | 102642473 | A | 8/2012 | |
| CN | 202518094 | U | 11/2012 | |
| CN | 102815486 | A | 12/2012 | |
| CN | 202753761 | U | 2/2013 | |
| CN | 103010040 | A | 4/2013 | |
| CN | 103171452 | A | 6/2013 | |
| CN | 103198571 | A | 7/2013 | |
| CN | 103199314 | A | 7/2013 | |
| CN | 103373226 | A | 10/2013 | |
| CN | 103448568 | A | 12/2013 | |
| CN | 205736880 | U | * 11/2016 | |
| CN | 205736880 | U | 11/2016 | |
| CN | 108215878 | A | 6/2018 | |
| CN | 108290551 | A | 7/2018 | |
| CN | 108985392 | A | 12/2018 | |
| CN | 208570691 | U | 3/2019 | |
| CN | 208665056 | U | 3/2019 | |
| CN | 109564045 | A | 4/2019 | |
| CN | 109564048 | A | 4/2019 | |
| CN | 109616596 | A | * 4/2019 | |
| CN | 208745726 | U | * 4/2019 | ............... B60K 1/04 |
| CN | 208745726 | U | 4/2019 | |
| CN | 208767776 | U | * 4/2019 | |
| CN | 209183680 | U | 7/2019 | |
| CN | 209467335 | U | 10/2019 | |
| CN | 212182497 | U | * 12/2020 | |
| DE | 102008031964 | A1 | 4/2009 | |
| DE | 102009004103 | A1 | 7/2010 | |
| DE | 202008008869 | U1 | 9/2010 | |
| DE | 202008008869 | U1 * | 10/2010 | ............ H02J 7/0054 |
| DE | 102010018447 | A1 | 11/2010 | |
| DE | 102010017752 | A1 | 2/2011 | |
| DE | 102010014081 | A1 | 10/2011 | |
| DE | 102010017417 | A1 | 12/2011 | |
| DE | 102012212079 | A1 | 1/2013 | |
| DE | 102011088345 | A1 | 6/2013 | |
| DE | 102012018906 | A1 | 4/2014 | |
| DE | 102014000131 | A1 | 7/2015 | |
| DE | 102014219991 | A1 | 4/2016 | |
| DE | 202016105623 | U1 | 11/2016 | |
| DE | 202016105652 | U1 | 2/2017 | |
| DE | 102016011894 | A1 | 4/2017 | |
| DE | 202017003208 | U1 | 9/2017 | |
| DE | 102017115539 | A1 | 1/2018 | |
| DE | 102017129653 | A1 | 6/2018 | |
| DE | 102019200875 | A1 | 7/2020 | |
| EP | 1113943 | A2 | 7/2001 | |
| EP | 1122857 | A2 * | 8/2001 | ............... B60L 1/003 |
| EP | 1218213 | A2 | 7/2002 | |
| EP | 1522450 | A2 | 4/2005 | |
| EP | 1880904 | A1 | 1/2008 | |
| EP | 1932704 | A2 | 6/2008 | |
| EP | 2177388 | A2 | 4/2010 | |
| EP | 2247462 | A1 | 11/2010 | |
| EP | 2593318 | A1 | 5/2013 | |
| EP | 2812992 | A1 | 12/2014 | |
| EP | 2859366 | A1 | 4/2015 | |
| EP | 2874270 | A1 | 5/2015 | |
| EP | 2996934 | A1 | 3/2016 | |
| EP | 3211755 | A1 | 8/2017 | |
| EP | 3429914 | A1 | 1/2019 | |
| EP | 3541653 | A1 | 9/2019 | |
| JP | H11157342 | A | 6/1999 | |
| JP | H11227548 | A * | 8/1999 | |
| JP | H11227548 | A | 8/1999 | |
| JP | 2003178723 | A * | 6/2003 | |
| JP | 2005247168 | A | 9/2005 | |
| JP | 2019523967 | A * | 8/2019 | |
| RU | 2627967 | C2 * | 8/2017 | .......... B60L 11/1809 |
| WO | WO-2014104566 | A1 * | 7/2014 | .......... H01M 10/488 |

* cited by examiner

ELECTRIFIED VEHICLE ROOF-MOUNTED BACKUP BATTERY

TECHNICAL FIELD

This disclosure relates generally to a backup battery for an electrified vehicle and, more particularly, to a backup battery that can be mounted to a roof of the electrified vehicle.

BACKGROUND

Electrified vehicles differ from conventional motor vehicles because electrified vehicles include a drivetrain having one or more electric machines powered by a battery pack. The electric machines can drive the electrified vehicles instead of, or in addition to, an internal combustion engine. The battery pack of an electrified vehicle can include one or more battery modules within an enclosure. The battery modules each include a plurality of individual battery cells.

SUMMARY

In some aspects, the techniques described herein relate to an electrified vehicle backup battery system, including: a traction battery pack of an electrified vehicle; and a backup battery assembly that is removably mounted to the electrified vehicle, the backup battery assembly configured to recharge the traction battery pack through a charge port of the electrified vehicle.

In some aspects, the techniques described herein relate to an electrified vehicle backup battery system, further including a cordset configured to electrically couple the backup battery assembly to the charge port of the electrified vehicle such that the backup battery assembly can recharge the traction battery pack.

In some aspects, the techniques described herein relate to an electrified vehicle backup battery system, wherein the cordset is external to the electrified vehicle when coupling the traction battery pack to the backup battery assembly.

In some aspects, the techniques described herein relate to an electrified vehicle backup battery system, wherein the backup battery assembly is a backup battery assembly bank.

In some aspects, the techniques described herein relate to an electrified vehicle backup battery system, further including a roof rack, the backup battery assembly removably mounted to the roof rack.

In some aspects, the techniques described herein relate to an electrified vehicle backup battery system, wherein the backup battery assembly is disposed above a roof of the electrified vehicle.

In some aspects, the techniques described herein relate to an electrified vehicle backup battery system, wherein the backup battery assembly is disposed above a roof of the electrified vehicle such that air can flow between the backup battery assembly and the roof.

In some aspects, the techniques described herein relate to an electrified vehicle backup battery system, further including a housing of the backup battery assembly, the housing providing an interior area that holds a plurality of individual battery modules.

In some aspects, the techniques described herein relate to an electrified vehicle backup battery system, wherein the interior area disposed vertically above a roof of the electrified vehicle.

In some aspects, the techniques described herein relate to an electrified vehicle backup battery system, further including at least one air duct configured to provide a path for air to flow between the interior area and other areas that are outside the housing.

In some aspects, the techniques described herein relate to an electrified vehicle backup battery system, wherein the at least one air duct includes at least one airduct on a passenger side of the housing and at least one air duct on a driver side of the housing.

In some aspects, the techniques described herein relate to an electrified vehicle backup battery system, further including a lid of the housing, the lid at least partially transparent.

In some aspects, the techniques described herein relate to an electrified vehicle backup battery system, further including a polyurethane foam within the interior area, the polyurethane foam lining the housing.

In some aspects, the techniques described herein relate to an electrified vehicle backup battery system, further including a communication module of the backup battery assembly, the communication module configured to communicate with the electrified vehicle.

In some aspects, the techniques described herein relate to a traction battery pack charging method, including: recharging a traction battery pack of an electrified vehicle from a backup battery assembly that is mounted above a roof of the electrified vehicle.

In some aspects, the techniques described herein relate to a traction battery pack charging method, wherein the backup battery assembly is removeable mounted to a roof rack of the electrified vehicle.

In some aspects, the techniques described herein relate to a traction battery pack charging method, further including electrically coupling the backup battery assembly to the traction battery pack through a charge port of the electrified vehicle.

In some aspects, the techniques described herein relate to a traction battery pack charging method, further including spacing the backup battery assembly above the roof of the electrified vehicle to permit airflow between the roof and the backup battery assembly.

In some aspects, the techniques described herein relate to a traction battery pack charging method, further including communicating between the backup battery assembly and the electrified vehicle using wireless communications. backup battery system for AN electrified vehicle The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Electrified vehicles can include battery packs that require recharging. Charging stations are typically used to recharge the battery packs. Users may be reluctant to drive an electrified vehicle in areas lacking charging stations.

This disclosure provides a backup battery assembly that can be removably mounted to a roof of a vehicle and utilized to recharge a traction battery pack of the vehicle. The backup battery assembly is particularly useful for vehicles that frequent areas lacking high numbers of charging stations, such as off-roading vehicles utilized for off-roading.

Figure 1:
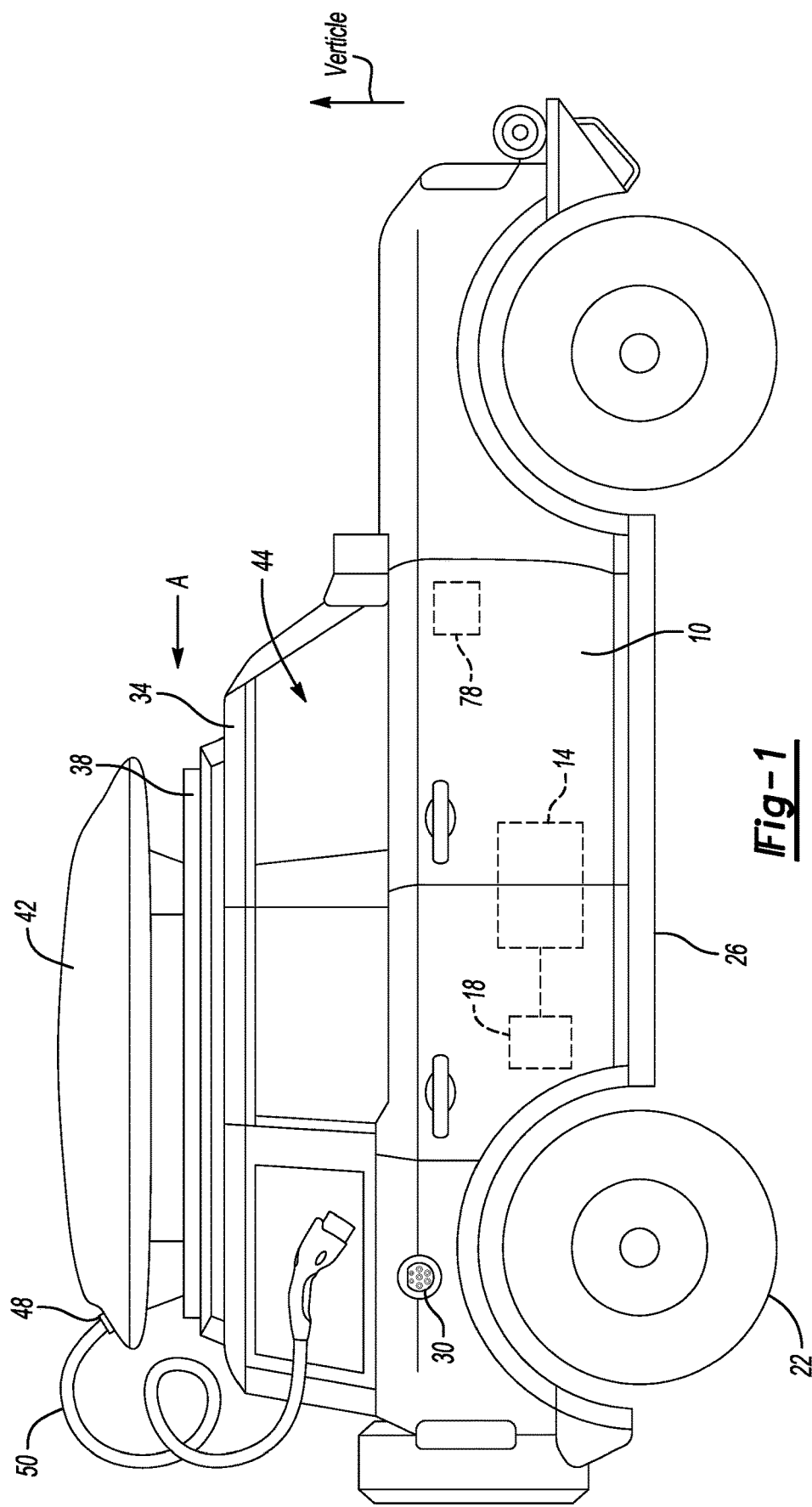
FIG. 1 illustrates a side view of a backup battery assembly mounted to an electrified vehicle.
Figure 2:
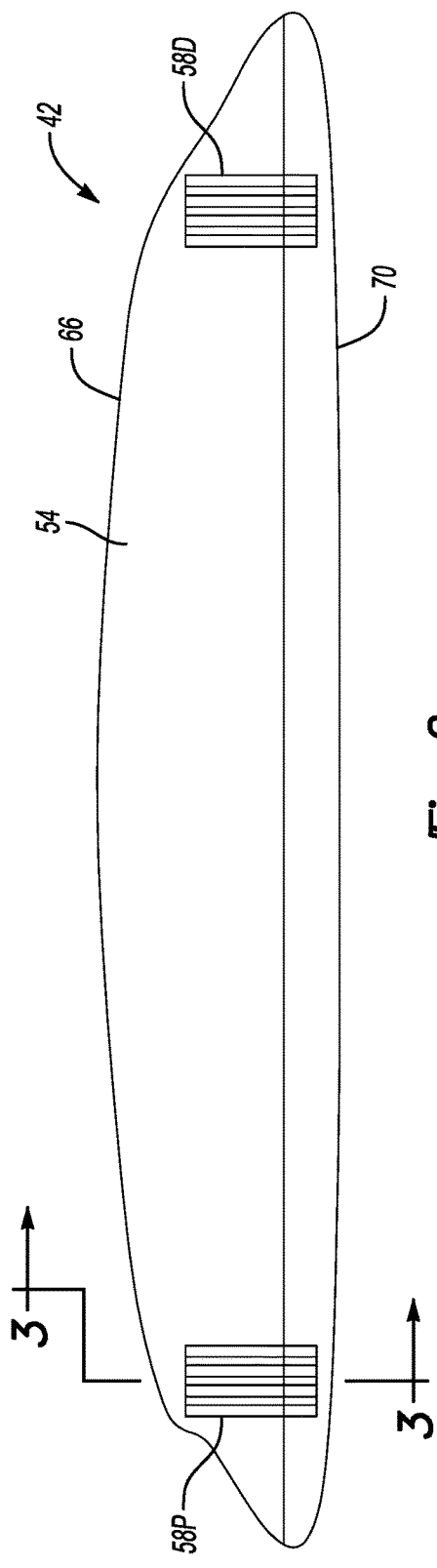
FIG. 2 illustrates a front view of the backup battery assembly from FIG. 1.
Figure 3:
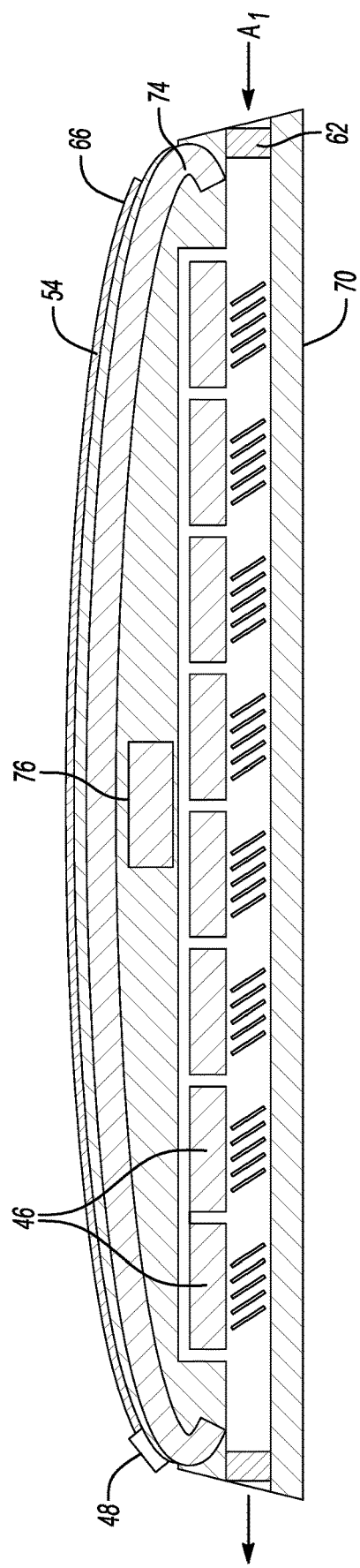
FIG. 3 illustrates a section view at line 3-3 in FIG. 2.

With reference to FIGS. 1-3, an example vehicle 10 is an electrified vehicle. The electrified vehicle 10 includes a traction battery pack 14, at least one electric machine 18, and a plurality of wheels 22. The traction battery pack 14 can provide electrical power to the electric machine 18, which converts the electrical power to torque to drive the wheels 22. The traction battery pack 14 can be a relatively high-voltage battery. The traction battery pack 14 is considered a traction battery pack at least because electrical energy from the traction battery pack 14 can be used to propel the electrified vehicle 10. The traction battery pack 14 can be secured to various areas of the electrified vehicle 10, such as adjacent an underbody 26 of the electrified vehicle 10.

The example electrified vehicle 10 is an all-electric vehicle. In other examples, the electrified vehicle 10 is a hybrid electric vehicle, which selectively drives wheels using torque provided by an internal combustion engine instead of, or in addition to, torque provided by an electric machine powered by a traction battery pack. Generally, the electrified vehicle 10 could be any type of vehicle having a traction battery pack.

The electrified vehicle includes a charge port 30. Through the charge port 30, the electrified vehicle 10 can electrically couple to a charging station (not shown) through a cordset. Electrical energy from the charging station can be transferred to the traction battery pack 14 through the charge port 30. The electrical energy from the charging station can recharge the traction battery pack 14.

The electrified vehicle 10 includes a roof 34, a roof rack 38, and a backup battery assembly 42. The roof 34 is vertically above a passenger compartment 44 of the electrified vehicle 10. Vertical, for purposes of this disclosure is with reference to ground in a general orientation of the electrified vehicle 10 during ordinary operation.

The roof rack 38 can be used to transport various types of cargo including, but not limited to, cargo boxes, cargo bags, canoes, etc. In this example, the backup battery assembly 42 is mounted to the roof rack 38. The backup battery assembly 42 can be removably mounted to the roof rack 38. That is, the backup battery assembly 42 can be transitioned from the installed position shown in FIG. 1, to an uninstalled position when transporting the backup battery assembly 42 is no longer required. The backup battery assembly 42 has, in this example, the same shape as conventional roof-mounted cargo box.

The backup battery assembly 42 includes a plurality of battery modules 46 and a connection port 48. A cordset 50 can be used to electrically couple the backup battery assembly 42 to the electrified vehicle 10 by engaging the connection port 48 of the backup battery assembly 42 and the charge port 30 of the electrified vehicle 10. When the cordset 50 is operably coupled to the backup battery assembly 42 and the electrified vehicle 10 through the charge port 30, electrical energy from the battery module 46 in the backup battery assembly 42 can be transferred to the traction battery pack 14 through the cordset 50 to recharge the traction battery pack 14. The cordset 50 is external to the electrified vehicle 10 and the passenger compartment 44 when the cordset 50 is electrically coupled to the backup battery assembly 42 and the charge port 30. That is, the cordset 50 is visible and not routed through any interior area of the electrified vehicle 10.

The backup battery assembly 42 includes a plurality of the individual battery modules 46. Thus, the backup battery assembly 42 is a backup battery assembly bank. The backup battery assembly 42 is part of an electrified vehicle backup battery system for the electrified vehicle 10.

While the example backup battery assembly 42 is shown removably mounted to the electrified vehicle 10 via the roof rack 38, the backup battery assembly 42 could mount to other areas of the electrified vehicle 10 in other examples.

The example backup battery assembly 42 is disposed vertically above the roof 34. The backup battery assembly 42 is spaced from the roof 34 to provide a gap between the roof 34 and the backup battery assembly 42. Air can flow through the gap when the electrified vehicle 10 is driven. The air can cool the backup battery assembly 42.

The backup battery assembly 42 includes a housing 54 that holds and encloses the battery modules 46 within an interior area. Along outboard sides of the backup battery assembly 42 are air ducts 58D and 58P. The air duct 58D is on the driver side. The air duct 58P is on the passenger side.

The airducts 58P, 58D each provide paths, such as air grilles, for air $A_1$ to move from outside the backup battery assembly 42 to inside the interior area within the housing 54. The flow of air between the interior area and areas outside the backup battery assembly 42 can cool the battery modules 46. The airducts 58*p* and 58*d* can include opening covered by valves 62 that inhibit moisture from entering the airducts. The valves 62 can be a door that is remotely actuated between open and closed positions. The user may close the valves 62 when in a sandy environment or a cold environment.

The housing 54 includes a lid 66 and a tray 70. The lid 66 can be at least partially transparent to facilitate thermal energy transfer to and from the interior area of the backup battery assembly 42. In this example, the lid 66, and potentially the tray 70, are lined with a polyurethane foam 74, which can help manage thermal energy levels within the interior area and keep the interior area relatively cool.

The battery modules 46 each includes a plurality of individual lithium-ion batteries in this example. The batteries can be recharged from a charging station when available via the cordset 50. A controller module 76 can communicate wirelessly with a communication module 78 of the electrified vehicle 10 to control the recharging of the traction battery pack from the backup battery. The controller module 76 can be used to manage energy transfer. The controller module 76 can communicate with the communication module 78 via Bluetooth or another wireless communication protocol.

A method of charging the traction battery pack 14 with the backup battery assembly 42 can include charging the backup battery assembly 42 and then mounting the backup battery assembly 42 to the roof rack 38 of the electrified vehicle 10. The electrified vehicle 10 is then driven to a location, such as a campsite, without readily accessible recharging stations. The driving reduces the state of charge of the traction battery pack 14.

Once the electrified vehicle 10 is parked at the location, a user can couple the cordset 50 to the charge port 30 and the backup battery assembly 42 so that the backup battery assembly 42 can recharge the traction battery pack 14.

The removable mountable backup battery assembly 42 is, in some examples, sold as an aftermarket item. In other examples, the backup battery assembly 42 can be leased or rented prior to an off-roading trip, for example.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An electrified vehicle backup battery system, comprising:
   a traction battery pack of an electrified vehicle; and
   a backup battery assembly that is removably mounted to the electrified vehicle, the backup battery assembly configured to recharge the traction battery pack through a charge port of the electrified vehicle.

2. The electrified vehicle backup battery system of claim 1, further comprising a cordset configured to electrically couple the backup battery assembly to the charge port of the electrified vehicle such that the backup battery assembly can recharge the traction battery pack.

3. The electrified vehicle backup battery system of claim 2, wherein the cordset is external to the electrified vehicle when coupling the traction battery pack to the backup battery assembly.

4. The electrified vehicle backup battery system of claim 1, wherein the backup battery assembly is a backup battery assembly bank.

5. The electrified vehicle backup battery system of claim 1, further comprising a roof rack, the backup battery assembly removably mounted to the roof rack.

6. The electrified vehicle backup battery system of claim 1, wherein the backup battery assembly is disposed above a roof of the electrified vehicle.

7. The electrified vehicle backup battery system of claim 1, wherein the backup battery assembly is disposed above a roof of the electrified vehicle such that air can flow between the backup battery assembly and the roof.

8. The electrified vehicle backup battery system of claim 1, further comprising a housing of the backup battery assembly, the housing providing an interior area that holds a plurality of individual battery modules.

9. The electrified vehicle backup battery system of claim 8, wherein the interior area disposed vertically above a roof of the electrified vehicle.

10. The electrified vehicle backup battery system of claim 8, further comprising at least one air duct configured to provide a path for air to flow between the interior area and other areas that are outside the housing.

11. The electrified vehicle backup battery system of claim 10, wherein the at least one air duct includes at least one airduct on a passenger side of the housing and at least one air duct on a driver side of the housing.

12. The electrified vehicle backup battery system of claim 8, further comprising a lid of the housing, the lid at least partially transparent.

13. The electrified vehicle backup battery system of claim 8, further comprising a polyurethane foam within the interior area, the polyurethane foam lining the housing.

14. The electrified vehicle backup battery system of claim 8, further comprising a communication module of the backup battery assembly, the communication module configured to communicate with the electrified vehicle.

15. The electrified vehicle backup battery system of claim 1, wherein the charge port faces outboard from the electrified vehicle.

16. The electrified vehicle backup battery system of claim 1, wherein the charge port is within a side panel of the electrified vehicle.

17. The electrified vehicle backup battery system of claim 2, wherein the cordset is further configured to electrically couple the backup battery assembly to the charge port of the electrified vehicle such that the backup battery assembly can recharge the traction battery pack when the electrified vehicle is parked.

* * * * *